United States Patent [19]
Baker et al.

[11] Patent Number: 5,214,549
[45] Date of Patent: May 25, 1993

[54] ACOUSTICALLY DAMPED DISC DRIVE ASSEMBLY

[75] Inventors: Jonathan P. Baker, Oklahoma City; Kenneth L. Pottebaum, Yukon, both of Okla.

[73] Assignee: Seagate Technology, Inc., Scotts Valley, Calif.

[21] Appl. No.: 729,497

[22] Filed: Jul. 12, 1991

[51] Int. Cl.⁵ .............................................. G11B 33/14
[52] U.S. Cl. .............................. 360/97.02; 360/97.01; 360/98.01
[58] Field of Search ................ 360/97.01, 98.01, 97.02

[56] References Cited

U.S. PATENT DOCUMENTS

| | | |
|---|---|---|
| 2,810,842 | 10/1957 | Lewis . |
| 3,527,969 | 9/1970 | Papst ........................ 310/51 |
| 4,144,466 | 3/1979 | Hatch ........................ 310/13 |
| 4,216,505 | 8/1980 | Grant et al. ................ 360/104 |
| 4,408,238 | 10/1983 | Hearn ........................ 360/104 |
| 4,728,831 | 3/1988 | Cheng ........................ 310/13 |

OTHER PUBLICATIONS

Control of Noise and Vibration With Damping Materials by Ahid D. Nashif, Anatrol Corporation, Cincinnati, Ohio Jul. 1983.
Product Information; Scotchdamp; SJ2015X Viscoelastic Polymer Types 110, 112, 113, 830 Material Damping Properties.

*Primary Examiner*—Paul M. Dzierzynski
*Assistant Examiner*—Don Wong
*Attorney, Agent, or Firm*—Bill D. McCarthy; Edward P. Heller, III

[57] ABSTRACT

An acoustically damped disc drive assembly having a housing, the disc drive assembly having internally disposed components capable of generating acoustic vibrations, the housing having a cover comprised of a plurality of plate members, each pair of the plate members having a damping layer disposed therebetween for damping acoustic vibrations imparted to the cover by the internally disposed components. In addition to the damping layer, which is preferably a viscoelastic material compositely bonding such plate members together, an acoustic isolator area may be provided to surround the attachment points of the internally disposed components to the cover in order to provide further damping of the acoustic vibrations.

21 Claims, 4 Drawing Sheets

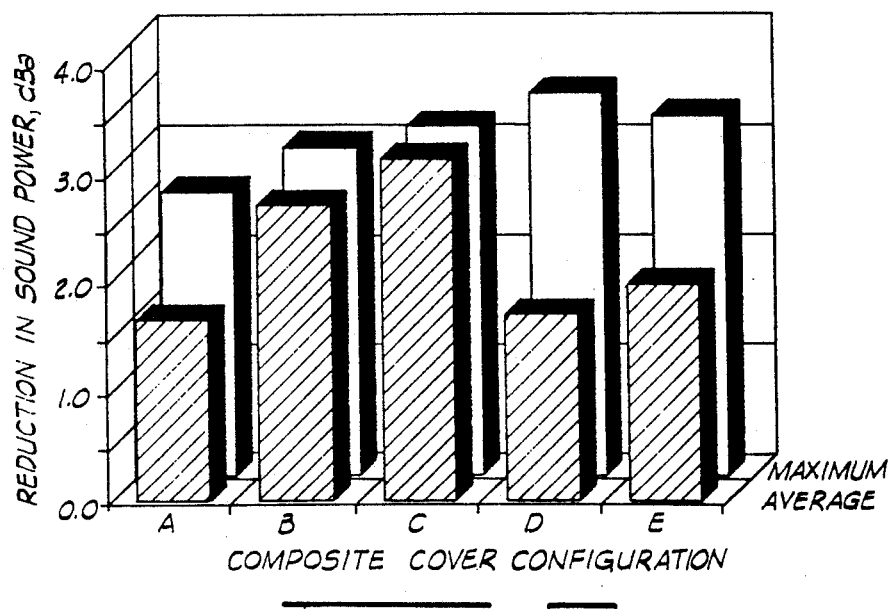
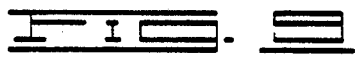
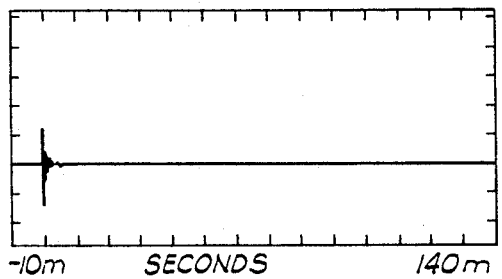
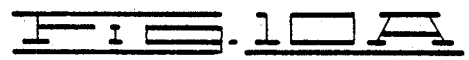
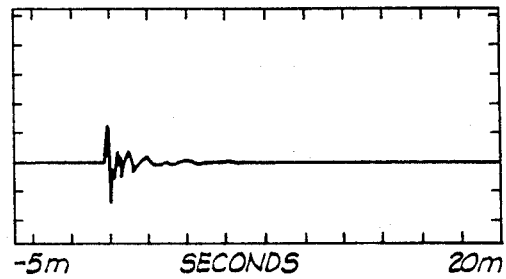
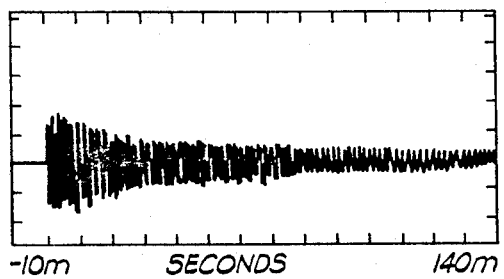
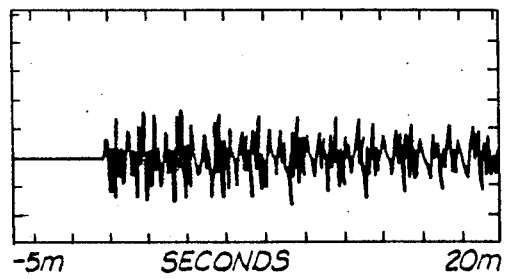
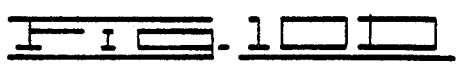

ACOUSTICALLY DAMPED DISC DRIVE ASSEMBLY

BACKGROUND OF THE INVENTION

1. Field of the Invention

This invention relates generally to the field of disc drive assemblies, and more particularly but not by way of limitation, to improvements in housings therefor which incorporate acoustic damping for reducing acoustic noise generated by disc drive assemblies.

2. Brief Description of the Prior Art

Disc drive assemblies of the type known as "Winchester" disc drive assemblies are well known in the industry. The archetype Winchester disc drive assemblies incorporated discs fourteen inches in diameter and were intended for use with large mainframe computers installed in specially constructed computer rooms in which environmental elements such as temperature and humidity could be controlled for optimum equipment operation. The users of such systems were typically located in locations far removed from the system and communicated with the system using keyboards and CRT displays, known in combination as remote terminals. Because only system maintenance and support personnel were required to work directly within the computer room, little consideration was given to acoustic noise generated by system elements such as cooling fans and disc drive motors.

However, with the advent of personal computers which are commonly located in home and office environments, acoustic noise generation has become a significant consideration in system design. In fact, in some marketplaces, particularly Europe, the amount of allowable acoustic noise in the workplace is strictly regulated by law.

With restrictions being placed on systems manufacturers, it has become common practice for manufacturers, which expect to sell their products multinationally, to analyze their intended market and specify their systems to meet the strictest requirements demanded in all target marketplaces.

Because most computer system manufacturers do not internally produce their own disc drive assemblies, but depend on specialized disc drive manufacturers, these system manufacturers have begun to strictly specify the amount of acoustic noise that the disc drive assembly itself can contribute to the overall system.

In disc drive assemblies of current technology, the major source of acoustic noise is sympathetic vibration of the disc drive housing caused by the spindle motor used to spin the discs or by the actuator used to move the read/write heads across the discs for data accesses. These disc drive assemblies are commonly in the form of a rectangular housing with a spindle motor and actuator motor mounted to one internal surface. Recent market demands for increased capacity, with accompanying increases in precision, have caused disc drive manufacturers to attach the shaft of the spindle motor and the pivot shaft of the rotary actuator motor to both the top and bottom of the disk drive housing. This has frequently resulted in housing surfaces vibrating at resonant frequencies that increase the total amount of acoustic noise.

Several approaches to acoustic noise reduction have been taken by disc drive manufacturers. Most involve the addition of compliant isolation devices between the noise source (the motors) and the external housing. However, such devices add expense to the design and require that space be set aside for them within the housing. With market trends toward increased capacity and smaller physical drive sizes, manufacturers have been understandably reluctant to allow room for these types of noise isolation devices in their designs.

Clearly, a need has long existed for an improved housing for disc drive assemblies for reducing acoustic noise generated by disc drive assemblies.

SUMMARY OF THE INVENTION

The present invention provides an improved housing for a disc drive assembly having internally disposed components generating acoustic vibrations, the present invention eliminating or substantially reducing the coupling of such acoustic vibrations to the housing. In the present invention, the housing has a cover comprising a plurality of plate members with damping layers disposed between pairs of plate members, such damping layers damping acoustic vibrations imparted to the cover by the internally disposed components. The damping layers, preferably of a viscoelastic material, are disposed between each pair of plate members and adhesively bond the plate members together.

In some applications, it may be desirable to incorporate acoustic isolator areas surrounding attachment points of the internally disposed components of the disc drive assembly, such acoustic isolator areas cooperating with the viscoelastic damping layers to further damp the acoustic vibrations.

It is an object of the present invention to provide an improved housing for disc drive assemblies to reduce acoustic noise generated by disc drive assemblies.

Another object of the present invention, while achieving the before-stated object, is to provide an improved housing for disc drive assemblies that is inexpensive to manufacture.

Other objects, features and advantages of the present invention will become apparent from the following detailed description when read in conjunction with the drawings and appended claims.

BRIEF DESCRIPTION OF THE DRAWINGS

FIG. 9 is a bar graph comparing the acoustic behavior of a sample of prior art covers to the acoustic behavior of several covers made in accordance with the present invention.

FIGS. 10A through 10D are graphic representations of the acoustic behavior of a prior art cover and a cover made in accordance with the present invention under specific test conditions.

DETAILED DESCRIPTION OF THE INVENTION

Figure 1:
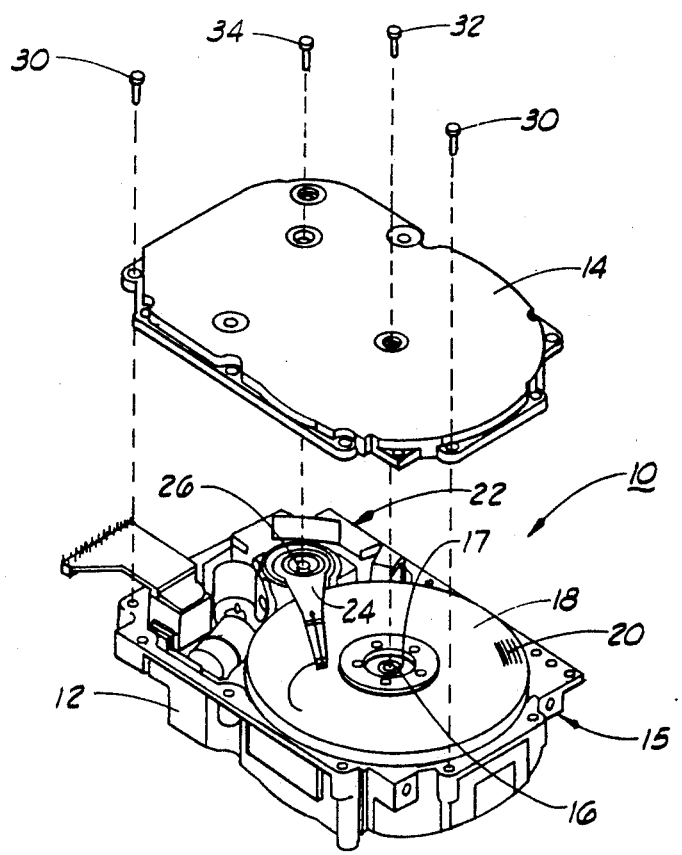
FIG. 1 is a perspective view of a prior art disc drive assembly with the cover removed from the housing, showing the relationship between the major mechanical components therein.

Referring to FIG. 1, shown is a perspective view of a typical disc drive assembly 10 having a housing 12 with a cover 14 removed to show the relationship between the major internal mechanical components. A spindle motor shaft 16, supporting a spindle motor 17, is attached to the housing 12 within the disc drive assembly 10. Mounted on the spindle motor 17 are a number of circular discs 18 coated with a magnetic recording medium. Digital information is recorded on the discs 18 in a large number of circular, concentric data tracks 20. When power is applied to the disc drive assembly 10, the spindle motor 17 rotates the discs 18 at a constant high speed. In the example shown, the discs 18 rotate in the counter-clockwise direction.

An actuator motor, shown generally at 22, is also mounted to the housing 12 and operates under the control of electronic circuitry (not shown) to selectively rotate an actuator body 24 about an actuator pivot shaft 26. Attached to the actuator body 24 is a plurality of read/write head assemblies 28 which are used for data recording and retrieval of information from the data tracks 20.

Disc drives typically have the data tracks 20 on the discs 18 at a density greater than 1000 tracks per inch measured radially on the disc surface. Furthermore, the actuator motor 22 used to move the read/write head assemblies 28 can typically seek to any desired data track 20 in less than about 20 miliseconds on the average. This makes the precision and stability of the geometric relationship between the discs 18 and read/write head assemblies 28 critically important.

In order to increase the precision and stability of the relationship between the discs 18 and the read/write head assemblies 28, both ends of the spindle motor shaft 16 and the actuator pivot shaft 26, about which the actuator 24 pivots, are secured to the housing 12 and the cover 14.

As shown in FIG. 1, a plurality of machine screws 30 (some of which are shown) are used to fasten the cover 14 to the housing 12 by appropriately disposed and mated apertures in the cover 14 and threaded bores in the housing 12. One particular screw 32 extends through the cover 14 and into a threaded bore in one end of the spindle motor shaft 16, while a second screw 34 fastens one end of the actuator pivot shaft 26 of the actuator body 24 in a similar manner. With this type of arrangement, when the disc drive assembly 10 is completely assembled, tilt between the actuator body 24 and the spindle motor 17 is minimized.

Figure 2:
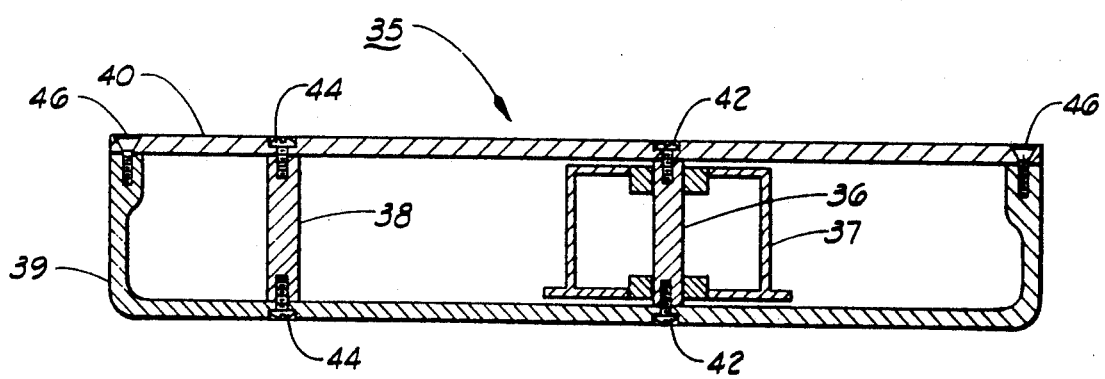
FIG. 2 is a semi-detailed, simplified cross-sectional view of a prior art disc drive assembly, such as in FIG. 1.

Referring now to FIG. 2, shown is a simplified cross-sectional view of a prior art disc drive assembly 35, similar to the disc drive assembly of FIG. 1. A spindle motor shaft 36 supporting a spindle motor 37 and an actuator pivot shaft 38 is shown attached to a housing 39 and a cover 40. For clarity, an actuator body supported by the actuator pivot shaft 38 has been omitted from FIG. 2.

The spindle motor shaft 36 is fastened to the housing 39 and to the cover 40 by screws 42. The actuator pivot shaft 38 is fastened to the housing 39 and to the cover 40 in a similar manner by screws 44. Further, the cover 40 is fastened to the housing 39 by screws 46. Mounting the spindle motor 37 and the actuator (not shown) in this manner provides for minimum "wobble" of the spindle motor and the actuator, thus preserving the intended geometric relation between the read/write head assembly and the discs (both not shown).

This configuration does, however, present a problem. Because the two motors are rigidly attached to both the housing 39 and the cover 40, any vibration in the motors will be transmitted to the housing 39 and the cover 40. This in turn causes both the housing 39 and the cover 40, which are essentially flat plates, to vibrate in sympathy with the motors, particularly if the natural frequency of either of the plates is a harmonic of the motor vibration. Such vibration can cause amplification of the vibrations into acoustic noise at these resonant frequencies.

It would be desirable, therefore, to isolate the vibration of these motors from the flat surfaces of the housing 39 and cover 40 without sacrificing the rigidity offered by this configuration. This is achieved using the present invention.

Figure 3:
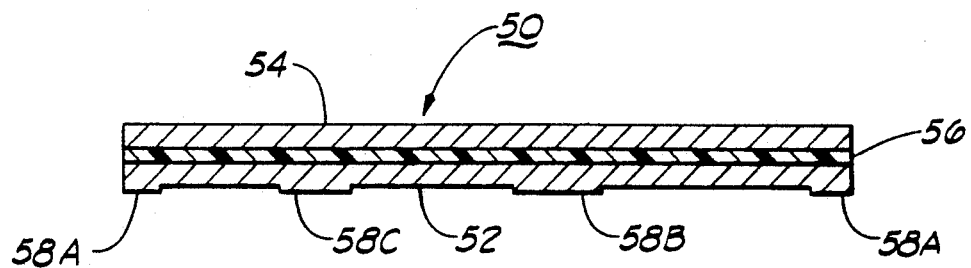
FIG. 3 is a diagrammatical representation in cross section of a cover for a housing for a disc drive assembly illustrating an embodiment of the present invention.

FIG. 3 is a diagrammatical, cross-sectional view of a cover 50 for a housing of a disc drive assembly illustrating the present invention. The configuration shown consists of an inner plate member 52 and an outer plate member 54 coupled by a viscoelastic damping layer 56. As shown, the inner plate member 52 includes attachment bosses 58A for mounting the cover 50 to a housing (not shown), a mounting boss 58B for attaching the top of the spindle motor shaft (not shown) to the inner plate member 52, and another mounting boss 58C for attaching the top of the rotary actuator pivot shaft (also not shown) to the inner plate member 52, such attachment preferably achieved by appropriately disposed apertures (not shown) through such bosses. Thus, vibrations of the spindle motor (not shown) and the actuator (also not shown) will be coupled to the inner plate member 52 at the mounting bosses 58B and 58C, respectively. The outer plate member 54 acts as a non-structural "dead mass" component that is effectively isolated from the vibration sources by the viscoelastic damping layer 56.

Co-pending U.S. patent application Ser. No. 673,967, filed Mar. 22, 1991 and assigned to the assignee of the present invention, is incorporated herein by reference and discloses a scheme for acoustic isolation of vibration sources from plate members by the inclusion of an acoustic isolator in the plate member in the area surrounding the attachment point of the vibration source. Similar acoustic isolators can be incorporated into the laminated cover of the present invention, as will be described below.

Figure 4:
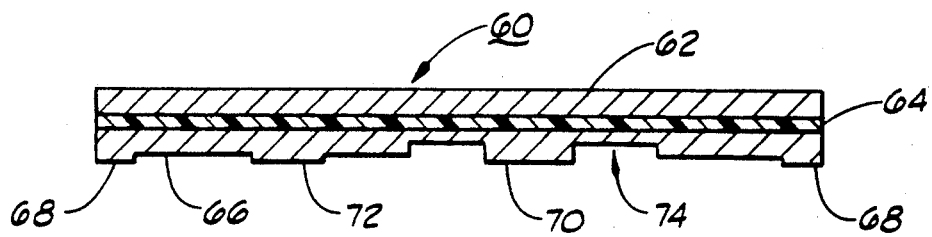
FIG. 4 is a diagrammatical representation in cross section of a cover for a housing for a disc drive assembly showing another embodiment of the present invention.

FIG. 4 is a diagrammatical representation in cross section of another embodiment of a cover 60 of the present invention. In the embodiment shown in FIG. 4, an outer plate member 62 serves as a "dead mass" acoustic damping component as discussed above in relation to FIG. 3. A viscoelastic damping layer 64 serves to attach the outer plate member 62 to an inner plate member 66 which again includes attachment bosses 68 for attaching the cover 60 to a housing (not shown), and mounting bosses 70, 72 for attaching the spindle motor shaft (not shown) and the actuator pivot shaft (not shown), respectively. However, in the embodiment shown in FIG. 4, the inner plate member 66 includes an acoustic isolator 74 surrounding the mounting boss 70 for the spindle motor shaft. The acoustic isolator 74 acts, as disclosed in the previously cited patent application, to further isolate the motor vibration sources from the remainder of the inner plate member 66, reducing to an even greater extent the amount of vibration which can pass from the inner plate member 66 through the viscoelastic damping layer 64 to the outer plate member 62. In this configuration, the outer plate member 62 can be inexpensively formed from sheet metal, while the inner plate member 66 can be cast and then machined to provide the required precision support for the spindle motor and actuator.

Figure 5:
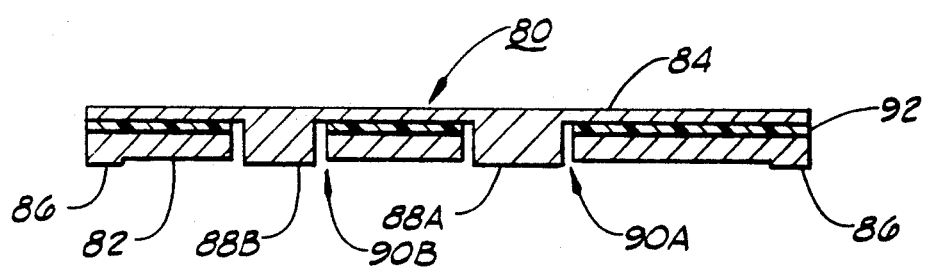
FIG. 5 is a diagrammatical representation in cross section of a cover for a housing for a disc drive assembly showing another embodiment of the present invention.

FIG. 5 shows a diagrammatical representation of another embodiment of a cover 80 made in accordance with the present invention. In this embodiment, the functions of attaching the cover 80 to a housing (not shown) and of mounting the tops of the spindle motor shaft and actuator pivot shaft have been divide between an inner plate member 82 and an outer plate member 84. That is, the inner plate member 82 includes attachment bosses 86 for attaching the cover 80 to the housing, while the outer plate member 84 incorporates mounting bosses 88A, 88B for mounting the spindle motor shaft and actuator pivot shaft (both not shown). The inner plate member 82 includes cutouts 90A, 90B to permit attachment of the internal components to the outer plate member 84, and the inner and outer plate members 82, 86 are joined by a viscoelastic damping layer 92.

Figure 6:
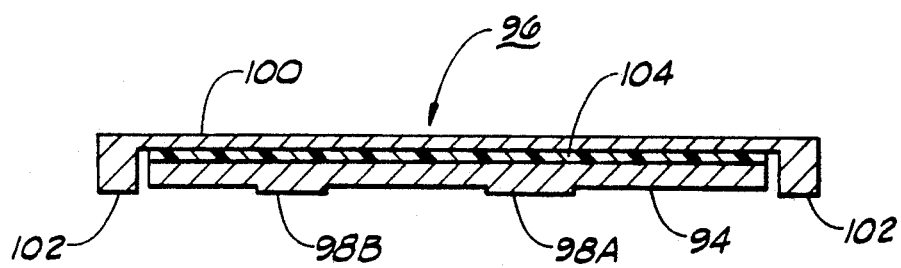
FIG. 6 is a diagrammatical representation in cross section of a cover for a housing for a disc drive assembly showing another embodiment of the present invention.

FIG. 6 shows yet another embodiment of the present invention in which the attachment and mounting roles of the two plate members have been reversed from the embodiment shown in FIG. 5. That is, an inner plate member 94 of a cover 96 includes mounting bosses 98A, 98B for mounting the tops of the spindle motor shaft and actuator pivot shaft (neither shown), while an outer plate member 100 is formed to include attachment bosses 102 for mounting the cover 96 to a housing (not shown). In this embodiment, the vibration sources, the spindle motor and the actuator, are isolated from the outside of the housing of the disc drive assembly by a viscoelastic damping layer 104 disposed between the inner and outer plate members 94, 100.

In all of the above described embodiments, acoustic damping is accomplished by the relatively large area of damping material sandwiched between outer and inner plate members. This damping material is preferably formed in a thin sheet with contact adhesive on both surfaces, thus allowing the damping material to act as the attachment mechanism for joining two plate members, while acoustically isolating the plate members from each other. A suitable damping material available with contact adhesive on both surfaces is "SCOTCHDAMP ®", manufactured by the 3M Company.

Figure 7:
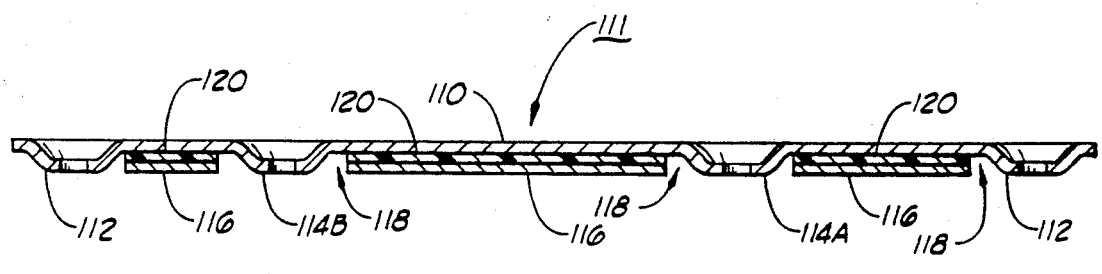
FIG. 7 is a diagrammatical representation in cross section of a cover for a housing for a disc drive assembly showing yet another embodiment of the present invention.

Referring now to FIG. 7, shown is another embodiment of the present invention. An outer plate member 110 of a cover 111, typically formed from sheet aluminum, is provided with attachment bosses 112 for attaching the cover 111 to a housing (not shown). The outer plate member 110 is also provided with mounting bosses 114A and 114B for attaching a spindle motor shaft and an actuator pivot shaft (both not shown) to the cover 111. The attachment bosses 112 and the mounting bosses 114A and 114B are formed by stamping the outer plate member 110. By stamping the outer plate member 110, countersinks are created for the heads of the mounting and attachment screws (not shown). An inner plate member 116, also typically formed of sheet aluminum, is die cut to incorporate cutouts 118 around the attachment bosses 112 and mounting bosses 114A and 114B. A viscoelastic damping layer 120, disposed between the outer plate member 110 and the inner plate member 116, is die cut to match the shape of the inner plate member 116. The viscoelastic damping layer 120 is provided with contact adhesive on both surfaces to join the outer and inner plate members 110 and 116. This configuration allows metal-to-metal contact between the cover 111 and the housing, thus permitting uniform tightening of the screws (not shown) used to mount the cover 111 to the housing, and insuring reliable and secure assembly of the cover 111 to the housing. The inner plate member 116 hangs from the viscoelastic damping layer 120 and acts as a "dead mass" component to damp any vibrations imposed on the outer plate member 110 by the spindle motor and actuator.

Figure 8:
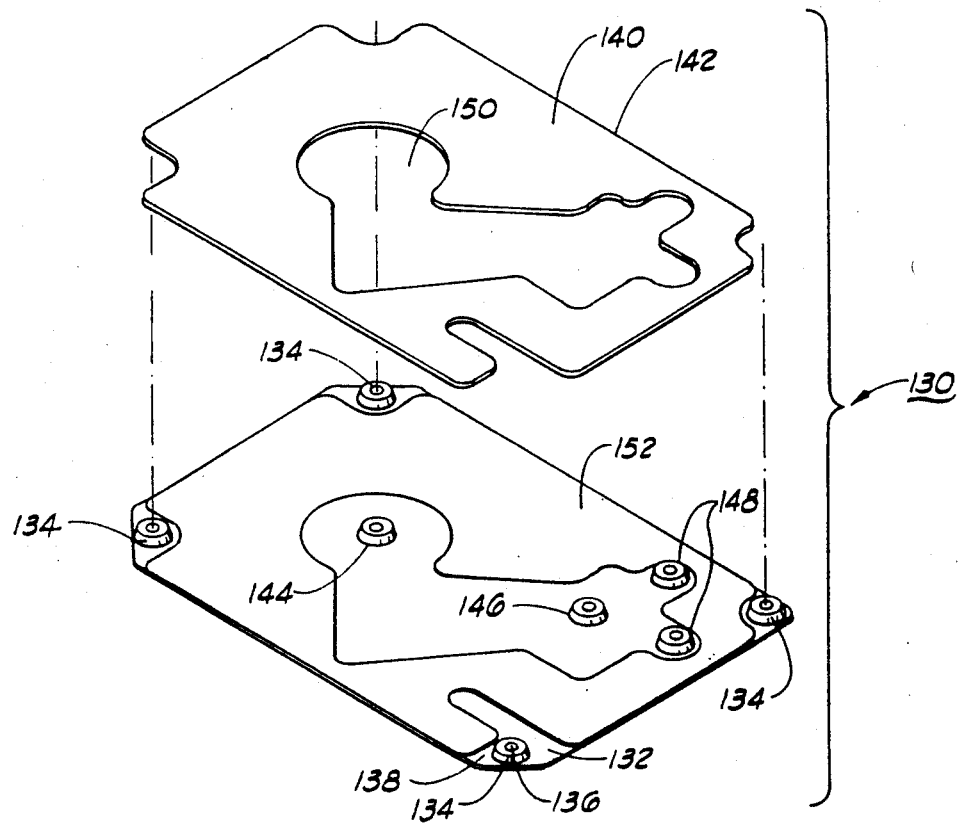
FIG. 8 is a partially exploded perspective view of the cover illustrated in FIG. 7.

FIG. 8 shows a partially exploded perspective view of a cover illustrated in accordance with the embodiment shown in FIG. 7. In FIG. 8, a cover 130 has been inverted to show its innerside, the side which faces the interior of the disc drive assembly when mounted on the housing thereof. An outer plate member 132 is shown to have a plurality of attachment bosses 134 which include screw holes 136 for mounting the cover 130 and a housing (not shown). The attachment bosses 134 are formed so that contact surfaces 138 of the attachment bosses 134 are in a coplanar relationship with an inner surface 140 of an inner plate member 142 when the cover 130 is secured to the housing. The outer plate member 132 also includes a spindle motor shaft mounting boss 144, an actuator pivot shaft mounting boss 146, and two actuator motor mounting bosses 148, all formed similarly to the attachment bosses 134 as described hereinabove.

The inner plate member 142 is relieved in all four corners to avoid direct contact between the plate members 132 and 142 in the areas surrounding the attachment bosses 134. Also, the inner plate member 142 is formed with a central opening 150 to provide spacing between the cover 130 and various internal components of the disc drive assembly (not shown). A viscoelastic damping layer 152 is shaped and dimensioned to match the shape and dimensions of the inner plate member 142. If desired, the area of the outer plate member 132 not mated to the viscoelastic damping layer 152 and inner plate member 142 can have additional damping material applied thereto. Preferably, both the outer and inner plate members are formed of sheet aluminum about 0.030 inch thick, and the viscoelastic damping layer 152 is formed about 0.002 inch thick. The resulting cover 130 is simpler and less expensive to implement than a comparable cast and machined cover, as well as being lighter without sacrificing necessary structural strength.

Tests of actual disc drive assemblies incorporating the present invention have shown it to be effective in reducing broad-band noise. The results of these tests are summarized in FIG. 9, a bar graph showing the maximum and average reduction in sound power emitted by a test population of disc drive assemblies using varying configurations of the cover of the present invention.

The differences in the configurations denoted "A" through "E" have been summarized in Table I below. The test population for configurations A, B, D, and E consisted of four individual disc drive assemblies, and the test population for configuration C consisted of two disc drive assemblies. In all configurations, the viscoelastic damping layer between the outer and inner plate members was a 0.002 inch thick layer of SCOTC-HDAMP ® SJ-2015, type 1202, and the "Thin Section" noted in Table I indicates the presence or absence of a 1.5-inch diameter relief surrounding the spindle motor mounting boss.

TABLE I

| Configuration | Outer Plate Thickness | Inner Plate Thickness | Thin Section Used |
|---|---|---|---|
| A | .050 | .030 | Yes |
| B | .050 | .030 | No |
| C | .050 | .030 | Yes |
| D | .030 | .030 | Yes |
| E | .030 | .050 | Yes |

As shown in Table I, the outer plate member was 0.050 inch thick in configurations A, B and C, and 0.030 inch thick in configurations D and E. The inner plate member was 0.030 inch thick in all configurations except E, where it was 0.050 inch thick.

Configurations A and B were covers made in accordance with the embodiment shown in FIG. 6; that is, the outer plate member was used to mount the cover to the housing and the spindle motor and actuator pivot shaft were mounted to the inner plate member. The difference between configurations A and B is that in configuration A, the outer plate member and the viscoelastic damping layer were removed in a 1.5 inch diameter area surrounding the spindle motor mounting boss, leaving a 0.030 inch "thin section".

Configuration C was made in accordance with the embodiment shown in FIG. 4; that is, the attachment bosses for attaching the cover to the housing and the mounting bosses for mounting the spindle motor shaft and actuator pivot shaft to the cover were all part of the inner plate member, while the outer plate member simply floated on the viscoelastic damping layer.

Configurations D and E were made in accordance with the embodiments shown in FIGS. 7 and 8. The cover was attached to the housing via the outer plate member, and the spindle motor shaft and the actuator pivot shaft were also mounted to the cover via the outer plate member. The inner plate member was suspended from the viscoelastic damping layer. Both configurations featured a 1.5 inch diameter area removed from the inner plate member and the viscoelastic damping layer surrounding the spindle motor attachment boss. The only difference in the two configurations was the thickness of the inner plate member, 0.030 inch in configuration D and .050 inch in configuration E.

As reflected in FIG. 9, all configurations resulted in significant reduction of generated noise levels. What does not show up from the graph of FIG. 9, but was evident from the testing, was that the greatest reduction in sound level was achieved in those disc drive assemblies that were noisiest with a standard cast and machined cover. This means that not only did al disc drive assemblies tested benefit from the use of the present invention, but that the greatest improvement was achieved on those disc drive assemblies that needed improvement the most.

FIGS. 10A, 10B, 10C, and 10D are graphic representations of the results of additional testing carried out on a standard cast and machined cover, and on a cover made in accordance with the embodiments of FIGS. 7 and 8 as described above. In this testing, a test fixture was created to suspend the cover by a very thin wire using one of the mounting apertures. An impact hammer generating a fixed input energy stimulus was then used to strike the cover. The resultant energy in the cover was then measured. In the graphs of FIGS. A-D, the horizontal axis represents time and the vertical axis represents the amplitude of the "ringing" resulting from the covers being struck. FIGS. 10A and 10B show results for the cover of the present invention and FIGS. 10C and 10D show results for standard cast and machined covers, with the time scale being altered between FIGS. 10A and 10B and between 10C and 10D. An examination of the graphs reveals that the standard cover rang for a period of time longer than 140 milliseconds after being struck, while the vibrations in the cover of the present invention were damped to effectively zero amplitude within about 2 milliseconds of impact, thus showing the superior damping characteristics of the present invention.

While these tests utilized specific plate materials and thicknesses and specific damping materials, similar reductions in generated sound levels are to be expected utilizing other plate materials and properly selected types of damping materials from other manufacturers. For instance, the outer or inner plate members of the present invention could be made of plastic, fiberglass, ceramic or other rigid material.

It will be clear that the present invention is well adapted to carry out the objects and to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A cover for a housing of a disc drive assembly, the disc drive assembly having internally disposed components generating acoustic vibrations, the cover comprising:
   a plurality of plate members; and
   damping means disposed between each pair of plate members for
   damping acoustic vibrations imparted to the cover by the internally disposed components.

2. The cover of claim 1 wherein the damping means comprises:
   a viscoelastic damping layer disposed between each pair of plate members and adhesively bonded to both such plate members.

3. The cover of claim 2 wherein the plurality of plate members comprises:
   an outer plate member; and 'an inner plate member coupled to the outer plate member by the viscoelastic damping layer.

4. The cover of claim 3 wherein the internally disposed components of the disc drive assembly includes a motor having a motor shaft, one end of the motor shaft supported by the cover, and wherein the inner plate member comprises:
   mounting means for attaching the motor shaft to the inner plate member; and attachment means for attaching the inner plate member to the housing of the disc drive assembly.

5. The cover of claim 3 wherein the internally disposed components of the disc drive assembly includes a motor having a motor shaft, one end of the motor shaft supported by the cover, and wherein the inner plate member comprises:
   mounting means for attaching the motor shaft to the inner plate member;
   attachment means for attaching the inner plate member to the housing of the disc drive assembly; and
   acoustic isolator means located in an area surrounding the attachment point of the motor shaft for further damping the acoustic vibrations in cooperation with the viscoelastic damping layer.

6. The cover of claim 3 wherein the internally disposed components of the disc drive assembly includes a motor having a motor shaft, one end of the motor shaft supported by the cover, and wherein the outer plate member comprises mounting means for attaching the motor shaft to the outer plate member; and wherein the inner plate member comprises attachment means for attaching the inner plate member to the housing of the disc drive assembly.

7. The cover of claim 3 wherein the internally disposed components of the disc drive assembly includes a motor having a motor shaft, one end of the motor shaft supported by the cover, and wherein the outer plate member comprises:
   mounting means for attaching the motor shaft to the outer plate member;
   attachment means for attaching the outer plate member to the housing of the disc drive assembly; and
   acoustic isolator means located in an area surrounding the attachment point of the motor shaft for further damping the acoustic vibrations in cooperation with the viscoelastic damping layer.

8. The cover of claim 7 wherein the inner plate member and the viscoelastic damping layer have mated openings about the acoustic isolator which allow the motor shaft to be attached to the outer plate member.

9. The cover of claim 3 wherein the internally disposed components of the disc drive assembly includes a motor having a motor shaft, one end of the motor shaft supported by the cover, and wherein the outer plate member comprises:
   attachment means for attaching the outer plate member to the housing of the disc drive assembly; and
   wherein the inner plate member comprises mounting means for attaching the motor shaft to the inner plate member.

10. The cover of claim 3 wherein the outer plate member comprises:
    attachment means for attaching the outer plate member to the housing of the disc drive assembly; and
    mounting means for attaching the motor shaft to the outer plate member.

11. The cover of claim 10 wherein the inner plate member and the viscoelastic damping layer have mated openings so that the motor shaft is securely attachable to the outer plate member and so that the outer plate member is securely attachable to the housing of the disc drive assembly.

12. An improved housing for a disc drive assembly having internally disposed components capable of generating acoustic vibrations, the housing having a cover comprising:
    a first plate member;
    a second plate member; and
    damping means disposed between the first and second plate members for bonding the first and second plate members together and for damping acoustic vibrations generated within the housing.

13. The improved housing of claim 12 wherein the damping means comprises:
    a damping layer of viscoelastic material; and
    adhesive means supported by the damping layer for bonding the damping layer to the first and second plate members.

14. The improved housing of claim 13 wherein one of the first and second plate members comprises:
    mounting means for attaching an internally disposed component to one of said plate members; and
    attachment means for attaching one of said plate members to the housing of the disc drive assembly.

15. The improved housing of claim 14 wherein the plate member attached to the internally disposed component further comprises:
    acoustic isolator means disposed in an area surrounding the mounting means for further damping the acoustic vibrations in cooperation with the viscoelastic damping layer.

16. The improved housing of claim 15 wherein the viscoelastic damping layer is provided with openings about the mounting means.

17. An improved housing for a disc drive assembly in which at least the pivot shaft is supported by the housing, the housing comprising:
    a plurality of plate members, one of the plate members supporting one end of the pivot shaft; and
    damping means disposed between the plate members for damping acoustic vibrations imparted by the pivot shaft, the damping means comprising a viscoelastic damping layer between each pair of plate members and contacting both such plate members.

18. The housing of claim 17 wherein the damping means further comprises adhesive means for adhesively bonding the damping layer and the plate members together.

19. The housing of claim 18 wherein one of the plate members is an inner plate member and one of the plate members is an outer plate member, the housing further comprising attachment means for attaching one of the inner and outer plate members to other portions of the housing to seal the disc drive assembly.

20. The housing of claim 19 wherein the pivot shaft is part of a spindle motor, and wherein the inner plate member is provided with mounting means for attaching one end of the pivot shaft to the inner plate member.

21. The housing of claim 20 wherein the disc drive assembly has another pivot shaft, such pivot shaft is part of an actuator, and wherein the inner plate member comprises mounting means for attaching one end of the actuator pivot shaft to the inner plate member.

* * * * *

UNITED STATES PATENT AND TRADEMARK OFFICE
CERTIFICATE OF CORRECTION

PATENT NO. : 5,214,549
DATED : May 25, 1993
INVENTOR(S) : Jonathan P. Baker & Kenneth L. Pottebaum It is certified that error appears in the above-indentified patent and that said Letters Patent is hereby corrected as shown below:

Column 5, line 25, delete "divide" and substitute therefor --divided--;

Column 7, line 64, delete "al" and substitute therefor --all--; and

Column 8, line 59, after "and" begin a new paragraph with "an".

Signed and Sealed this

Twenty-sixth Day of April, 1994

Attest:

BRUCE LEHMAN

*Attesting Officer*  *Commissioner of Patents and Trademarks*